(12) United States Patent
Beaufrere et al.

(10) Patent No.: US 12,297,753 B2
(45) Date of Patent: May 13, 2025

(54) SYSTEM AND PROCESS FOR ACTIVE DRAFT CONTROL OF POWER PLANT

(71) Applicant: GE Infrastructure Technology LLC, Greenville, SC (US)

(72) Inventors: Pierre Beaufrere, Belfort (FR); Garth Curtis Frederick, Greenville, SC (US)

(73) Assignee: GE Infrastructure Technology, LLC, Greenville, SC (US)

( * ) Notice: Subject to any disclaimer, the term of this patent is extended or adjusted under 35 U.S.C. 154(b) by 0 days.

(21) Appl. No.: 18/657,334

(22) Filed: May 7, 2024

(65) Prior Publication Data

US 2024/0376835 A1    Nov. 14, 2024

(30) Foreign Application Priority Data

May 11, 2023 (FR) ..................................... 2304670

(51) Int. Cl.

| F01K 23/10 | (2006.01) |
|---|---|
| F01D 17/06 | (2006.01) |
| F01D 17/08 | (2006.01) |
| F01D 21/00 | (2006.01) |

(52) U.S. Cl.
CPC .............. *F01K 23/10* (2013.01); *F01D 17/06* (2013.01); *F01D 17/08* (2013.01); *F01D 21/003* (2013.01)

(58) Field of Classification Search
CPC ........ F01K 23/10; F01K 23/101; F01D 17/06; F01D 17/08; F01D 21/003; Y02E 20/16; F02C 7/057; F02C 6/12; F02C 9/16; F05D 2270/303
See application file for complete search history.

(56) References Cited

U.S. PATENT DOCUMENTS

| 4,576,124 A * | 3/1986 | Martens ................ F22B 35/008 |
| | | 122/451 S |
| 5,737,911 A | 4/1998 | Hoizumi et al. |
| 7,107,774 B2 * | 9/2006 | Radovich ................ F01K 13/02 |
| | | 122/7 B |
| 9,382,848 B2 * | 7/2016 | D'Amato .............. F01K 23/101 |
| 11,965,423 B1 * | 4/2024 | Frederick ................ F01D 21/12 |

(Continued)

FOREIGN PATENT DOCUMENTS

EP    2975000 B1    1/2019

OTHER PUBLICATIONS

European Search Report dated Nov. 13, 2024 for European Application No. 24175084.3; pp. 6.

*Primary Examiner* — Jesse S Bogue
(74) *Attorney, Agent, or Firm* — James Pemrick; Charlotte Wilson; Hoffman Warnick LLC

(57) ABSTRACT

A combined cycle power plant CCPP includes one turbomachine and heat recovery steam generator HRSG that is shutdown (or offline) and a second turbomachine and heat recovery steam generator HRSG that is online. The HRSG supplied duct dampers can provide sealing air therein to ensure no back flow from the online turbomachine to the shutdown turbomachine of the plant. However, as cooling flow is desired, a controlled flow may be implemented to allow cooling flow to the shutdown turbomachine. This solution is valuable to cool CCPP configurations with multiple (e.g., 2) HRSGs discharging into a common exhaust stack without individual flues dedicated to each HRSG, regardless of turbomachine configuration.

20 Claims, 2 Drawing Sheets

(56) References Cited

U.S. PATENT DOCUMENTS

| | | | |
|---|---|---|---|
| 12,188,360 B2* | 1/2025 | Frederick | F01D 19/02 |
| 2005/0034445 A1 | 2/2005 | Radovich | |
| 2005/0268594 A1* | 12/2005 | Kurihara | F02C 9/16 |
| | | | 60/39.182 |
| 2024/0376833 A1* | 11/2024 | Frederick | F01D 19/00 |

* cited by examiner

[Fig. 1]
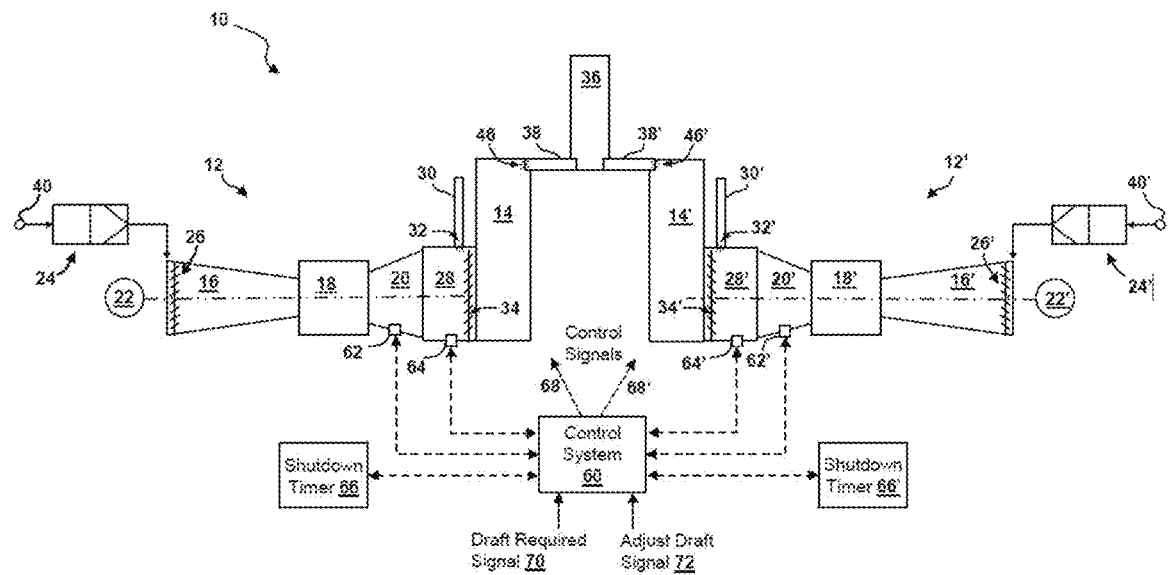
[Fig. 2]
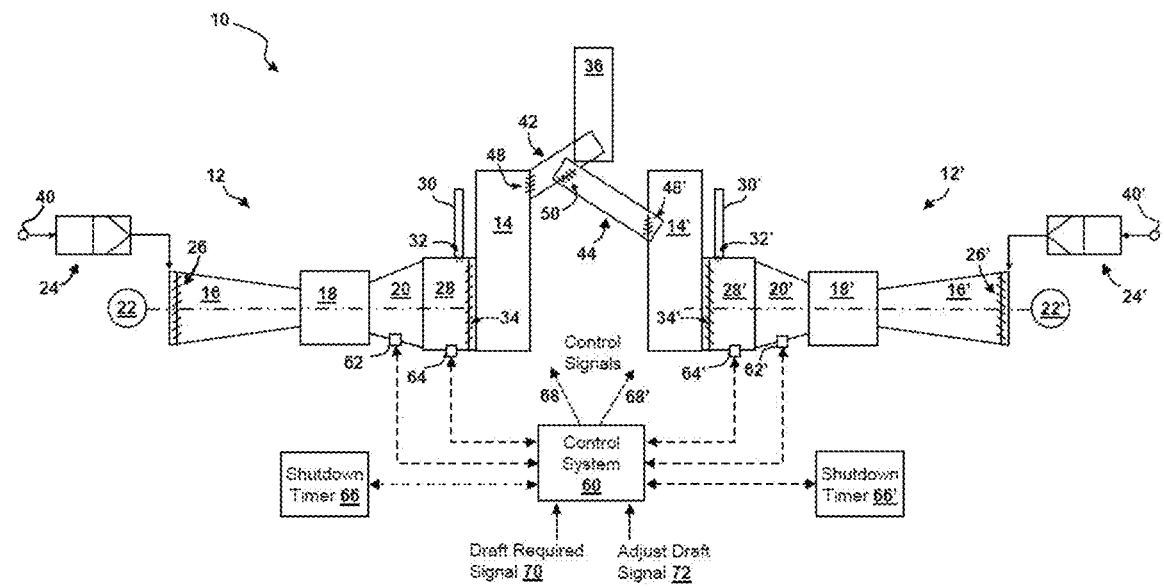

[Fig. 3]
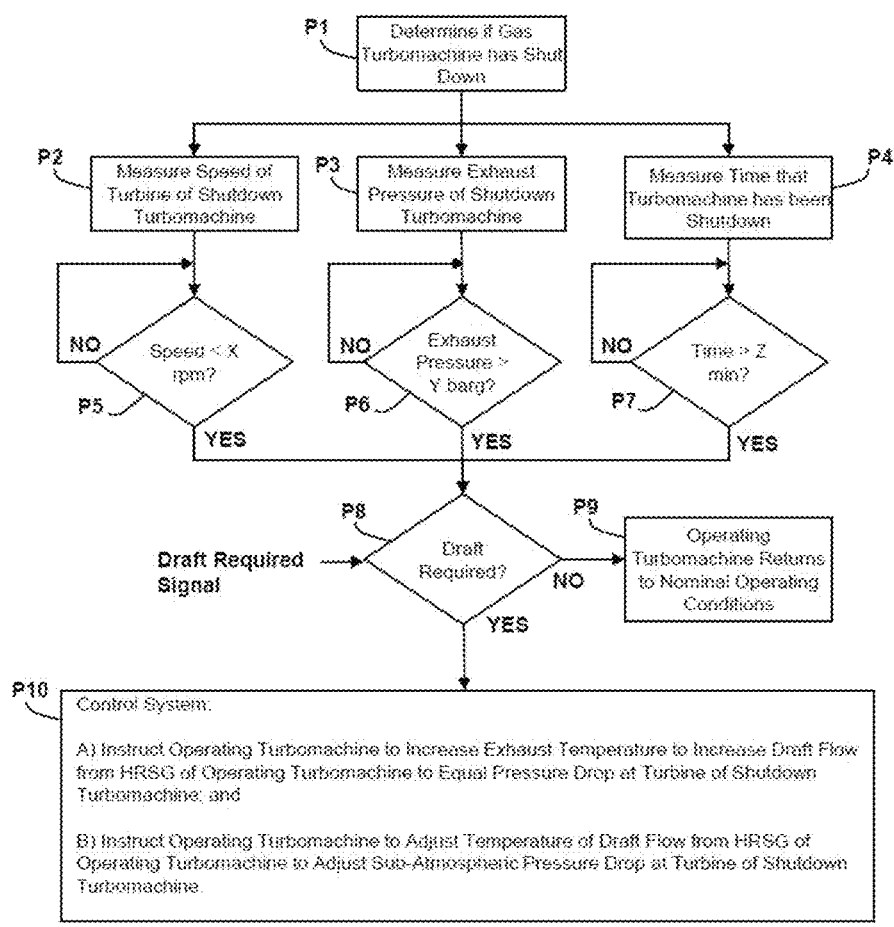

SYSTEM AND PROCESS FOR ACTIVE DRAFT CONTROL OF POWER PLANT

CROSS-REFERENCE TO RELATED APPLICATIONS

This application claims priority pursuant to 35 U.S.C. 119 (a) to French Application No. 2304670, filed May 11, 2023, which application is incorporated herein by reference in its entirety.

TECHNICAL FIELD

The disclosure relates generally to a process and system for providing active draft control. In particular, the disclosure relates to a process and system for controlling naturally induced airflow through combined cycle power plant (CCPP) equipment during shutdown.

BACKGROUND

Combined cycle power plants with turbomachines and heat recovery steam generators (HRSGs) are often connected to electrical grids that require flexible operation to meet changing power demands. Some power grid cycles command turbomachines to cease operation during low demand periods and restart soon thereafter to meet electric power demands of the grid. During operation, the various components of turbomachines and HRSGs expand and contract. For example, thermal expansion may occur due to the relatively elevated temperatures associated with turbine operation, and mechanical expansion may occur due to centripetal forces associated with rotation of the interior components.

Turbomachine components expand and contract at different and varying rates. The varying rates may result from component differences in material, geometry, location, and purpose. These differences are generally designed into the cooldown profiles of the turbomachine components that are factored into their restart criteria. To further accommodate for any discrepancy in expansion and contraction rates, a clearance may be designed into the turbomachine between the tips of blades and corresponding casing shrouds, typically referred to as "tip clearance." The tip clearance reduces the risk of turbine damage by permitting blades to expand without contacting the shroud.

However, the tip clearance substantially reduces the efficiency of the turbine during its operation by permitting a portion of heated gas to escape past blades without performing useful work, which wastes energy that would otherwise be available. A similar clearance may be designed into a compressor between the compressor blades and the compressor case, which may permit air to escape past the compressor blades.

During shutdown, ambient air infiltration can be naturally induced through the compressor and hot gas path of a turbomachine. The ambient air infiltration may be induced, for example, by at least one of natural convection of hot gas contained in the turbomachine, HRSG, and/or flue gas stacks, and pressure differences caused by wind speed and wind direction at the turbomachine inlet. Such ambient air infiltration may cool the turbomachine and HRSG, which may be detrimental to a quick restart due to temperature operational constraints imposed by the turbomachine and HRSG. If the HRSG and/or exhaust are not factored into a cooldown profile for restart, concerns may arise for restarting the turbomachine without undesirable rubs.

Undesirable rubs may occur due to expansion and an attempted restart when turbomachine components are still in an "expanded" condition, but the stator case has cooled and contracted to where the clearance is not adequate for rotation of the turbomachine components. Concerns such as rubs and contraction/expansion may be the result of, for example, retrofitting an HRSG and/or exhaust to the turbomachine, where the retrofitted HRSG design and operational aspects are not factored into a cooling schema of the turbomachine.

Thus, in order to allow restarting of the turbomachine and HRSG as quickly as possible, the induced draft through the turbomachine and HRSG can be actively controlled. Traditionally, in order to counteract the induced draft, variable inlet guide vanes of the turbomachine compressor (i.e., the vanes provided at the inlet of the compressor to control the air flow through the turbomachine) are closed and/or intake dampers and louvers (provided e.g., in the inlet section upstream of the compressor) and/or stack dampers (provided e.g., at the exhaust stack) are closed. The traditional approach reduces the natural draft through the turbomachine and possibly the HRSG, but because of leakages there can still be a substantial amount of induced natural draft.

BRIEF DESCRIPTION

All aspects, examples and features mentioned below can be combined in any technically possible way.

An aspect of the disclosure provides a method for active draft control in a system, the system including an operating turbomachine including a turbine and a heat recovery steam generator (HRSG) and a shutdown turbomachine including a turbine and an HRSG, the method including: measuring a rotational speed of the turbine of the shutdown turbomachine; measuring an exhaust pressure of the shutdown turbomachine; measuring a shutdown time of the shutdown turbomachine; and based on at least one of the measured rotational speed, the measured exhaust pressure, and the measured shutdown time, increasing an exhaust gas temperature of the operating turbomachine to increase draft flow from the HRSG of the operating turbomachine to equal a pressure drop at the turbine of the shutdown turbomachine.

Another aspect of the disclosure includes any of the preceding aspects, and wherein, based on at least one of the measured rotational speed, the measured exhaust pressure, and the measured shutdown time, adjusting a draft flow temperature of the operating turbomachine to add sub-atmospheric pressure at the turbine of the shutdown turbomachine.

Another aspect of the disclosure includes any of the preceding aspects, and wherein, increasing the exhaust gas temperature of the operating turbomachine and adjusting the draft flow temperature of the operating turbomachine are determined by: comparing the measured rotational speed of the turbine of the shutdown turbomachine to a first threshold value; comparing the measured exhaust pressure of the shutdown turbomachine to a second threshold value; and comparing the measured shutdown time of the shutdown turbomachine to a third threshold.

Another aspect of the disclosure includes any of the preceding aspects, and wherein, the first threshold is about 150 revolutions per minute; the second threshold is about −0.1 barg; and the third threshold is about 60 minutes.

Another aspect of the disclosure provides a system, including: a shutdown turbomachine including a turbine and a heat recovery steam generator (HRSG); an operating turbomachine including a turbine and an HRSG; a common exhaust stack shared by the HRSG of the shutdown turbomachine and the HRSG of the operating turbomachine; and a control system configured to increase an exhaust gas temperature of the operating turbomachine to increase draft flow from the HRSG of the operating turbomachine to equal a pressure drop at the turbine of the shutdown turbomachine, based on at least one of a rotational speed of the turbine of the shutdown turbomachine, an exhaust pressure of the shutdown turbomachine, and a shutdown time of the shutdown turbomachine.

Another aspect of the disclosure includes any of the preceding aspects, and wherein the control system is further configured to adjust a draft flow temperature of the operating turbomachine to add sub-atmospheric pressure at the turbine of the shutdown turbomachine, based on at least one of the measured rotational speed, the measured exhaust pressure, and the measured shutdown time.

Another aspect of the disclosure includes any of the preceding aspects, and wherein, the system further includes: a sensor for measuring the rotational speed of the turbine of the shutdown turbomachine; a sensor for measuring the exhaust pressure of the shutdown turbomachine; and a timer for measuring the shutdown time of the shutdown turbomachine.

Another aspect of the disclosure includes any of the preceding aspects, and wherein the control system is further configured to increase the exhaust gas temperature of the operating turbomachine and adjust the draft flow temperature of the operating turbomachine by: comparing the measured rotational speed of the turbine of the shutdown turbomachine to a first threshold value; comparing the measured exhaust pressure of the shutdown turbomachine to a second threshold value; and comparing the measured shutdown time of the shutdown turbomachine to a third threshold.

Another aspect of the disclosure includes any of the preceding aspects, and wherein, the control system is configured to increase the exhaust gas temperature of the operating turbomachine and adjust the draft flow temperature of the operating turbomachine when: the rotational speed of the turbine of the shutdown turbomachine is less than the first threshold value; the exhaust pressure of the shutdown turbomachine is greater than the second threshold; and the shutdown time of the shutdown turbomachine is greater than the third threshold.

Another aspect of the disclosure includes any of the preceding aspects, and wherein: the first threshold is about 150 revolutions per minute; the second threshold is about −0.1 barg; and the third threshold is about 60 minutes.

Another aspect of the disclosure includes any of the preceding aspects, and wherein, the system further includes a first exhaust duct for connecting the HRSG of the operational turbomachine to the common exhaust stack; and a second exhaust duct for connecting the HRSG of the shutdown turbomachine to the common exhaust stack.

Another aspect of the disclosure includes any of the preceding aspects, and wherein at least one of the first exhaust duct and the second exhaust duct are directly connected to the common exhaust duct.

Another aspect of the disclosure includes any of the preceding aspects, and wherein, at least one of the first exhaust duct and the second exhaust duct includes a damper.

A further aspect of the disclosure includes a computer-readable medium comprising computer-executable instructions, which when executed, perform a method for active draft control through a system, the system including an operating turbomachine including a turbine and a heat recovery steam generator (HRSG) and a shutdown turbomachine including a turbine and an HRSG, the method including: measuring a rotational speed of the turbine of the shutdown turbomachine; measuring an exhaust pressure of the shutdown turbomachine; measuring a shutdown time of the shutdown turbomachine; and based on at least one of the measured rotational speed, the measured exhaust pressure, and the measured shutdown time, increasing an exhaust gas temperature of the operating turbomachine to increase draft flow from the HRSG of the operating turbomachine to equal a pressure drop at the turbine of the shutdown turbomachine.

Another aspect of the disclosure includes any of the preceding aspects, and wherein, based on at least one of the measured rotational speed, the measured exhaust pressure, and the measured shutdown time, adjusting a draft flow temperature of the operating turbomachine to add sub-atmospheric pressure at the turbine of the shutdown turbomachine.

Another aspect of the disclosure includes any of the preceding aspects, and wherein increasing the exhaust gas temperature of the operating turbomachine and adjusting the draft flow temperature of the operating turbomachine are determined by comparing the measured rotational speed of the turbine of the shutdown turbomachine to a first threshold value; comparing the measured exhaust pressure of the shutdown turbomachine to a second threshold value; and comparing the measured shutdown time of the shutdown turbomachine to a third threshold.

Another aspect of the disclosure includes any of the preceding aspects, and wherein, increasing the exhaust gas temperature of the operating turbomachine and adjusting the draft flow temperature of the operating turbomachine are performed when: the rotational speed of the turbine of the shutdown turbomachine is less than the first threshold value; the exhaust pressure of the shutdown turbomachine is greater than the second threshold; and the shutdown time of the shutdown turbomachine is greater than the third threshold.

Another aspect of the disclosure includes any of the preceding aspects, and wherein, the first threshold is about 150 revolutions per minute; the second threshold is about −0.1 barg; and the third threshold is about 60 minutes.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 is a schematic of a combined cycle power plant (CCPP) including two gas turbomachines, each with a heat recovery steam generator (HRSG) sharing a common exhaust stack, and a system for active draft control according to embodiments of the disclosure;

FIG. 2 is a schematic of a CCPP including two gas turbomachines, each with a HRSG sharing a common exhaust stack, and a system for active draft control according to other embodiments of the disclosure;

FIG. 3 is a flowchart of a process for active draft control through a CCPP according to embodiments of the disclosure.

DETAILED DESCRIPTION

Combined cycle power plant (CCPP) cooling schemes, which include use of a fan/blower (hereinafter "fan") followed by natural cooling, generally rely on periodic exhaust stack damper openings. CCPP cooling schemes may also generally rely on thermal draft, for example at sub-atmospheric pressure levels, at an entrance of an exhaust stack of a heat recovery steam generator (HRSG).

As embodied by the disclosure, CCPP cooling schemes typically allow fan flow to continue for up to several hours (e.g., 4 hours) after shutdown. The fan flow can induce a natural cooling flow once the fan flow is shut off. During a gas turbomachine/HRSG base load operation, the pressure at the entrance of an HRSG exhaust stack may be slightly above atmospheric pressure due, for example, to friction loss in the exhaust stack being greater than the buoyancy gain. In certain embodiments of the disclosure, the pressure can be about 0.34 mbar or about 0.14 inch H2O.

As embodied by the disclosure, in a CCPP where one turbomachine/HRSG is shutdown (or offline) and a second turbomachine/HRSG is online, HRSG supplied duct dampers can provide sealing air therein to ensure no back flow from the online turbomachine/HRSG to the shutdown turbomachine/HRSG of the CCPP. However, as cooling flow is desired, a controlled flow may be implemented to allow cooling flow to the shutdown turbomachine. This solution is valuable to cool CCPP configurations with multiple (e.g., 2) HRSGs discharging into a common exhaust stack without individual flues dedicated to each HRSG, regardless of turbomachine configuration.

Disclosed herein are systems and methods of controlling naturally induced airflow drafting through power plant equipment (e.g., a turbomachine) during shutdown. Advantageously, by controlling the naturally induced airflow, heat loss from the stator casing of a turbomachine and the outer casing of an HRSG during a shutdown cycle is reduced. Drafting may be induced through the turbomachine in either a downstream direction (normal flow direction) or an upstream direction (reverse or opposite flow direction), depending on operating and environmental conditions. By reducing heat loss at shutdown, the systems and methods disclosed herein may increase the clearances between the blade tips and the stator case during a hot restart cycle thus avoiding tip rub during a hot restart. In other words, by reducing heat loss of the stator casing during the shutdown cycle, larger clearances may be achieved during the hot restart cycle, which may permit a tightening of the clearances during the steady state cycle to increase efficiency. Referring now to the drawings, wherein like numerals refer to like components, FIG. 1 illustrates a combined cycle power plant (CCPP) 10 including first and second gas turbomachines 12, 12'. The first gas turbomachine 12 includes a gas turbine 20, a heat recovery steam generator (HRSG) 14, and an exhaust system 28. The second gas turbomachine 12' also includes a gas turbine 20', an HRSG 14', and an exhaust system 28'. Each of the two gas turbomachines 12, 12' are substantially similar. As embodied by the disclosure, the two gas turbomachines 12, 12' share a common HRSG exhaust stack 36, as described hereinafter.

The first gas turbomachine 12 further includes a compressor 16 and a combustion chamber 18. Likewise, the second gas turbomachine 12' further includes a compressor 16' and a combustion chamber 18'. The gas turbine 20 and/or the gas turbine 20' may be connected to one or more electric generators 22, 22' that is in turn electrically connected to an electric grid (now shown). In other applications, the gas turbine 20 and/or the gas turbine 20' may be connected to other machines according to need and design.

Upstream of the compressor 16, the first turbomachine 12 includes an inlet section 24 for ambient air 40 that is supplied to the compressor 16. In addition, the compressor 16 may typically be provided with variable inlet guide vanes 26 to control the amount of ambient air 40 that is supplied to the compressor 16. Similarly, upstream of the compressor 16', the second turbomachine 12' includes an inlet section 24' for ambient air 40' that is supplied to the compressor 16'. The compressor 16' may also be provided with variable inlet guide vanes 26' to control the amount of ambient air 40' that is supplied to compressor 16'.

An exhaust system 28 is provided downstream of the gas turbine 20. The exhaust system 28 may be connected to a bypass stack 30 and/or the HRSG 14. A damper 32 may be provided to selectively connect the exhaust system 28 to the bypass stack 30. An exhaust damper 34 may be provided to selectively connect the exhaust system 28 to the HRSG 14. An exhaust system 28' may also be provided downstream of the gas turbine 20' and may be connected to a bypass stack 30' and/or the HRSG 14'. A damper 32' and an exhaust damper 34' may also be provided to selectively connect the exhaust system 28' to the bypass stack 30' and the HRSG 14', respectively.

As embodied by the disclosure, a common HRSG exhaust stack 36 may be provided downstream of each HRSG 14, 14' to direct exhaust to the atmosphere from each HRSG 14, 14'. An exhaust duct 38 directly connects the HRSG 14 to the common HRSG exhaust stack 36. Similarly, an exhaust duct 38' directly connects the HRSG 14' to the common HRSG exhaust stack 36.

FIG. 2 illustrates a further configuration of the CCPP 10. In FIG. 2, the HRSG 14 includes an exhaust duct 42 that leads directly into the common exhaust stack 36. The HRSG 14' includes an exhaust duct 44 that connects to the exhaust duct 42 such that flow from the exhaust duct 44 can proceed to the common HRSG exhaust stack 36 through the exhaust duct 42. Thus, as embodied by the disclosure, exhaust from the HRSGs 14, 14' may flow to the common HRSG exhaust stack 36, either directly via exhaust ducts 38, 38' (FIG. 1) and exhaust duct 42 (FIG. 2) or indirectly from one of the HRSGs 14' via exhaust ducts 42 and 44 (FIG. 2). While FIG. 2 illustrates the HRSG 14 being directly connected to the common HRSG exhaust stack 36 by the exhaust duct 42, aspects of the disclosure include directly connecting either the HRSG 14 or the HRSG 14' via its respective exhaust duct 42 or 44 to the common HRSG exhaust stack 36 via the other exhaust duct 44 or 42, respectively.

Referring to FIG. 1, in certain aspects of the disclosure, HRSG stack dampers 46, 46' may be provided to close and control the flow of exhaust gas from the HRSGs 14, 14' to the common HRSG exhaust stack 36. The HRSG stack dampers 46, 46' may be provided at the connection of the HRSGs 14, 14' to the exhausts ducts 38, 38', as illustrated in FIG. 1. Another aspect of the disclosure includes positioning HRSG stack dampers 46, 46' at any point along the exhaust ducts 38, 38'.

As depicted in FIG. 2, the HRSG 14 is directly connected by the exhaust duct 42 to the common HRSG exhaust stack 36. Further, the HRSG 14' is connected to the exhaust duct 44, which is connected to exhaust duct 42, which in turn is connected to the common HRSG exhaust stack 36. To this extent, HRSG stack dampers 48, 48' may be positioned at any point along the exhaust ducts 42, 44, respectively, to control the flow of exhaust gas from the HRSG 14, 14' to the common HRSG exhaust stack 36. Further, an aspect of the disclosure includes positioning another HRSG stack damper 50 at the intersection of the exhaust duct 42 and the exhaust duct 44 to control the flow of exhaust therebetween.

As embodied by the disclosure, use of a common HRSG exhaust stack (e.g., common HRSG exhaust stack 36) coupled to two HRSGs (e.g., HRSGs 14, 14') can prevent normal cooldown of a gas turbine (e.g., gas turbine 20) after shutdown when the other gas turbine and HRSG (e.g., gas turbine 20' and HRSG 14') remain in operation. In certain aspects of the embodiments, with the operational gas turbine (e.g., gas turbine 20') operating at a high load, a pressure drop at the common HRSG exhaust stack 36 may still be higher than the available draft of the common HRSG exhaust stack 36. This pressure differential may result in a back pressure to the shutdown gas turbine (e.g., gas turbine 20). As embodied by the disclosure, a control system 60 may be employed to provide sub-atmospheric pressure via active draft control to the shutdown gas turbine (e.g., gas turbine 20) with minimum hardware change and limited power generation loss.

FIG. 3 is a flowchart of a method for active draft control through a CCPP (such as the CCPP 10 depicted in FIGS. 1 and 2) including multiple HRSGs coupled to a common HRSG exhaust stack, according to embodiments of the disclosure. In the following discussion, the CCPP includes at least a first gas turbomachine and a second gas turbomachine. The first gas turbomachine includes a gas turbine, a HRSG, and an exhaust system, and the second gas turbomachine includes a gas turbine, a HRSG, and an exhaust system. The method may, for example, be performed by/using a control system such as the control system 60 depicted in FIGS. 1 and 2. The control system 60 may be part of the overall control system of CCPP 10 or an addition to the overall control system. A single control system 60 may be provided, or each gas turbomachine 12, 12' may include their own control systems that cooperate to provide the functionality of the control system 60 described herein.

At process P1, a determination is made that one of the gas turbine of the first gas turbomachine or the gas turbine of the second gas turbomachine has shut down and the other of the gas turbine of the first gas turbomachine or the gas turbine of the second gas turbomachine is operating. The determination regarding shutdown may be provided, for example, automatically by the control system 60 or via operator input to the control system 60. At process P2, the rotational speed of the turbine of the shutdown gas turbomachine is measured. For example, as depicted in FIGS. 1 and 2, speed sensors 62, 62', coupled to the turbines 20, 20' of the turbomachines 12, 12', may be used to determine the speed of the turbines 20, 20'. At process P3, the exhaust pressure of the shutdown gas turbomachine is measured. The exhaust pressure may be measured, for example, as depicted in FIGS. 1 and 2, by pressure sensors 64, 64' coupled to the exhaust systems 28, 28' of the turbomachines 12, 12'. At process P4, the time that the shutdown gas turbine has been shutdown (e.g., provided by shutdown timers 66, 66') is measured by the control system 60. The speed of the turbine of the shutdown gas turbomachine and the exhaust pressure of the shutdown gas turbomachine are provided to the control system 60.

At process P5, the control system 60 compares the speed of the turbine of the shutdown gas turbomachine to a threshold value of X rotations per minute (rpm). For example, the threshold value of X rpm may be equal to about 50 RPM to about 300 RPM. At process P6, the control system 60 compares the exhaust pressure of the shutdown gas turbomachine to a threshold value of Y (e.g., in bars above ambient or atmospheric pressure (barg)). For example, the threshold value of Y barg may be equal to about −0.3 barg to about −0.1 barg. At process P7, the control system 60 compares the shutdown time of the shutdown turbomachine assembly to a threshold value of Z. For example, the threshold value of Z may be equal to about 30 minutes to about 90 minutes.

At process P8, the control system 60 receives a draft required signal 70 (FIGS. 1 and 2) from the shutdown gas turbomachine regarding the cooldown state of the shutdown gas turbomachine. If the shutdown gas turbomachine has completed the cooldown process (NO at process P8), the operating gas turbomachine returns to nominal operating conditions at process P9. If the shutdown gas turbomachine has not completed the cooldown process (YES at process P8), flow passes to process P10.

If the control system 60 has determined that the speed of the turbine shutdown gas turbomachine is less than the threshold value of X rpm (YES at process P5), that the exhaust pressure of the shutdown gas turbomachine is greater than the threshold value of Y (YES at process P6), that the shutdown time of the shutdown gas turbomachine is greater than a threshold value of Z (YES at process P7), and that the shutdown gas turbomachine has not completed the cooldown process (YES at process P8), then at process P10, the control system 60 provides appropriate control signals (e.g., control signals 68, 68' (FIGS. 1 and 2)) to the operating gas turbomachine. According to embodiments, the control signals: instruct the operating gas turbomachine to increase its exhaust gas temperature to increase draft flow from the HRSG of the operating gas turbomachine to equal the pressure drop at the gas turbine of the shutdown gas turbomachine; and instruct the operating gas turbomachine to adjust a temperature of the draft flow from the HRSG of the operating gas turbomachine to adjust the sub-atmospheric pressure at the gas turbine of the shutdown gas turbomachine. The draft flow from the HRSG of the operating gas turbomachine may be adjusted, for example, by increasing stack temperature or decreasing total mas flow. Total mass flow may be reduced, for example, by unloading the operating gas turbomachine. Stack temperature may be increased, for example, by increasing the operating gas turbomachine exhaust temperature or by bypassing HRSG water around economizers (e.g., tube heat exchangers) reducing the HRSG-Rankine cycle efficiency.

According to additional embodiments, the control system 60 may further receive an adjust draft signal 72 (FIGS. 1 and 2) from the shutdown gas turbomachine requesting more/less draft flow in response to the adjustments performed in process P10. In response, the control system 60 provides appropriate instructions to the operating gas turbomachine to increase/decrease draft flow.

As will be appreciated by one skilled in the art, the present disclosure may be embodied as a system, method, or controls that may utilize a computer program product.

Accordingly, the present disclosure may include hardware embodiments, software embodiment (including firmware, resident software, micro-code, etc.) or an embodiment combining software and hardware aspects that may all generally be referred to herein as a "circuit," "module" or "system." Furthermore, the present disclosure may take the form of a computer program enabled control embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "determining" or "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about" as applied to a particular value of a range, applies to both end values and, unless otherwise dependent on the precision of the instrument measuring the value, may indicate +/−10% of the stated value(s).

The invention claimed is:

1. A method for active draft control through a system, the system including an operating turbomachine including a turbine and a heat recovery steam generator HRSG and a shutdown turbomachine including a turbine and an HRSG, the method comprising:

measuring a rotational speed of the turbine of the shutdown turbomachine;
measuring an exhaust pressure of the shutdown turbomachine;
measuring a shutdown time of the shutdown turbomachine; and
based on at least one of the measured rotational speed, the measured exhaust pressure, and
the measured shutdown time, increasing an exhaust gas temperature of the operating turbomachine to increase draft flow from the HRSG of the operating turbomachine to equal a pressure drop at the turbine of the shutdown turbomachine.

2. The method according to claim 1, further comprising, based on at least one of the measured rotational speed, the measured exhaust pressure, and the measured shutdown time, adjusting a draft flow temperature of the operating turbomachine to add sub-atmospheric pressure at the turbine of the shutdown turbomachine.

3. The method according to claim 2, wherein increasing the exhaust gas temperature of the operating turbomachine and adjusting the draft flow temperature of the operating turbomachine are determined by:
comparing the measured rotational speed of the turbine of the shutdown turbomachine to a first threshold value;
comparing the measured exhaust pressure of the shutdown turbomachine to a second threshold value; and
comparing the measured shutdown time of the shutdown turbomachine to a third threshold.

4. The method according to claim 3, wherein increasing the exhaust gas temperature of the operating turbomachine and adjusting the draft flow temperature of the operating turbomachine are performed when:
the rotational speed of the turbine of the shutdown turbomachine is less than the first threshold value;
the exhaust pressure of the shutdown turbomachine is greater than the second threshold; and
the shutdown time of the shutdown turbomachine is greater than the third threshold.

5. The method according to claim 4, further comprising:
monitoring a state of a cooldown process of the shutdown turbomachine; and
returning the operational turbomachine to nominal operating conditions if the shutdown turbomachine has completed the cooldown process.

6. The method according to claim 1, wherein the HRSG of the first turbomachine and the HRSG of the second turbomachine share a common exhaust stack.

7. A system, comprising:
shutdown turbomachine including a turbine and a heat recovery steam generator HRSG;
an operating turbomachine including a turbine and an HRSG;
a common exhaust stack shared by the HRSG of the shutdown turbomachine and the HRSG of the operating turbomachine; and
a control system configured to increase an exhaust gas temperature of the operating turbomachine to increase draft flow from the HRSG of the operating turbomachine to equal a pressure drop at the turbine of the shutdown turbomachine, based on at least one of a rotational speed of the turbine of the shutdown turbomachine, an exhaust pressure of the shutdown turbomachine, and a shutdown time of the shutdown turbomachine.

8. The system according to claim 7, wherein the control system is further configured to adjust a draft flow temperature of the operating turbomachine to add sub-atmospheric pressure at the turbine of the shutdown turbomachine, based on at least one of the measured rotational speed, the measured exhaust pressure, and the measured shutdown time.

9. The system according to claim 8, further comprising:
a sensor for measuring the rotational speed of the turbine of the shutdown turbomachine;
a sensor for measuring the exhaust pressure of the shutdown turbomachine; and
a timer for measuring the shutdown time of the shutdown turbomachine.

10. The system according to claim 8, wherein the control system is further configured to increase the exhaust gas temperature of the operating turbomachine and adjust the draft flow temperature of the operating turbomachine by:
comparing the measured rotational speed of the turbine of the shutdown turbomachine to a first threshold value;
comparing the measured exhaust pressure of the shutdown turbomachine to a second threshold value; and
comparing the measured shutdown time of the shutdown turbomachine to a third threshold.

11. The system according to claim 10, wherein the control system is configured to increase the exhaust gas temperature of the operating turbomachine and adjust the draft flow temperature of the operating turbomachine when:
the rotational speed of the turbine of the shutdown turbomachine is less than the first threshold value;
the exhaust pressure of the shutdown turbomachine is greater than the second threshold; and
the shutdown time of the shutdown turbomachine is greater than the third threshold.

12. The system according to claim 11, wherein
the first threshold is about 50 revolutions per minute to about 300 revolutions per minute;
the second threshold is about −0.03 to about −0.1 barg; and
the third threshold is about 30 minutes to about 90 minutes.

13. The system according to claim 7, further comprising:
a first exhaust duct for connecting the HRSG of the operational turbomachine to the common exhaust stack; and
a second exhaust duct for connecting the HRSG of the shutdown turbomachine to the common exhaust stack.

14. The system according to claim 13, wherein at least one of the first exhaust duct and the second exhaust duct are directly connected to the common exhaust duct.

15. The system according to claim 14, wherein at least one of the first exhaust duct and the second exhaust duct includes a damper.

16. A computer-readable medium comprising computer-executable instructions, which when executed, perform a method for active draft control through a system, the system including an operating turbomachine including a turbine and a heat recovery steam generator HRSG and a shutdown turbomachine including a turbine and an HRSG, the method comprising:
measuring a rotational speed of the turbine of the shutdown turbomachine;
measuring an exhaust pressure of the shutdown turbomachine;
measuring a shutdown time of the shutdown turbomachine; and
based on at least one of the measured rotational speed, the measured exhaust pressure, and the measured shutdown time, increasing an exhaust gas temperature of the operating turbomachine to increase draft flow from the HRSG of the operating turbomachine to equal a pressure drop at the turbine of the shutdown turbomachine.

17. The computer-readable medium according to claim 16, wherein the method further comprises, based on at least one of the measured rotational speed, the measured exhaust pressure, and the measured shutdown time, adjusting a draft flow temperature of the operating turbomachine to add sub-atmospheric pressure at the turbine of the shutdown turbomachine.

18. The computer-readable medium according to claim 17, wherein increasing the exhaust gas temperature of the operating turbomachine and adjusting the draft flow temperature of the operating turbomachine are determined by:
   comparing the measured rotational speed of the turbine of the shutdown turbomachine to a first threshold value
   comparing the measured exhaust pressure of the shutdown turbomachine to a second threshold value; and
   comparing the measured shutdown time of the shutdown turbomachine to a third threshold.

19. The computer-readable medium according to claim 18, wherein increasing the exhaust gas temperature of the operating turbomachine and adjusting the draft flow temperature of the operating turbomachine are performed when:
   the rotational speed of the turbine of the shutdown turbomachine is less than the first threshold value;
   the exhaust pressure of the shutdown turbomachine is greater than the second threshold; and
   the shutdown time of the shutdown turbomachine is greater than the third threshold.

20. The computer-readable medium according to claim 19, wherein the method further comprises:
   monitoring a state of a cooldown process of the shutdown turbomachine; and
   returning the operational turbomachine to nominal operating conditions if the shutdown turbomachine has completed the cooldown process.

* * * * *

UNITED STATES PATENT AND TRADEMARK OFFICE
CERTIFICATE OF CORRECTION

PATENT NO. : 12,297,753 B2
APPLICATION NO. : 18/657334
DATED : May 13, 2025
INVENTOR(S) : Pierre Beaufrere et al.

It is certified that error appears in the above-identified patent and that said Letters Patent is hereby corrected as shown below:

In the Claims

Column 12 In Claim 12, Line 35 reads "...the second threshold is about -0.03 to about -0.1 barg"..."
but it should read "the second threshold is about -0.3 to about -0.1 barg"......"

Signed and Sealed this
Twenty-ninth Day of July, 2025

Coke Morgan Stewart
*Acting Director of the United States Patent and Trademark Office*